US008654877B2

(12) United States Patent
Tong et al.

(10) Patent No.: US 8,654,877 B2
(45) Date of Patent: Feb. 18, 2014

(54) MULTIPLE-INPUT, MULTIPLE-OUTPUT TELECOMMUNICATIONS SCHEMES

(75) Inventors: Fei Tong, Meldreth (GB); Andrei Popescu, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 257 days.

(21) Appl. No.: 13/179,178

(22) Filed: Jul. 8, 2011

(65) Prior Publication Data

US 2013/0010884 A1 Jan. 10, 2013

Related U.S. Application Data

(63) Continuation-in-part of application No. 13/178,342, filed on Jul. 7, 2011, now abandoned.

(51) Int. Cl.
*H04B 7/02* (2006.01)

(52) U.S. Cl.
USPC ........... 375/267; 375/260; 375/262; 375/295; 375/316; 375/340

(58) Field of Classification Search
USPC ......... 375/219, 259, 260, 267, 271, 279, 286, 375/295, 299, 302, 316, 322, 334, 340, 344
See application file for complete search history.

(56) References Cited

U.S. PATENT DOCUMENTS

| 8,179,775 B2 * | 5/2012 | Chen et al. | 370/203 |
| 8,498,362 B2 * | 7/2013 | Zhang et al. | 375/285 |

(Continued)

FOREIGN PATENT DOCUMENTS

| EP | 1 453 223 | 9/2004 |
| GB | 2475098 | 5/2011 |

OTHER PUBLICATIONS

Roh et al., "Channel Feedback Quantization Methods for Miso and Mimo Systems", IEEE Symposium on Personal, Indoor and Mobile Radio Communications, vol. 2, pp. 805-809, Sep. 2004.

(Continued)

*Primary Examiner* — Hirdepal Singh
(74) *Attorney, Agent, or Firm* — RatnerPrestia

(57) ABSTRACT

This disclosure concerns beam-forming vectors and beam-forming matrices for multiple-input, multiple-output (MIMO) communications systems. These systems, from the method perspective, provide, according to one embodiment, a method of feeding back, to a transmitter from a receiver in a MIMO communications system, at least part of a beam-forming vector of a beam-forming matrix, wherein: the vector relates to a spatial stream of the MIMO system; the vector comprises a series of elements; each element specifies a beam-forming weight for a respective transmit antenna of the transmitter; and the method comprises: calculating a scaling factor that would scale a first element of the vector to a value of one; scaling the other element or elements of the vector with the scaling factor; and feeding back the scaled other element or elements to the transmitter to inform a beam-forming process. These systems, from the method perspective, provide, according to another embodiment, a method of processing a beam-forming matrix, wherein: the beam-forming matrix is for adjusting signals that are to issue from the transmit antennae of a MIMO communications system; the MIMO communications system comprises a transmitter and a receiver; the beam-forming matrix is capable of being decomposed into a series of beam-forming vectors; each beam-forming vector relates to a spatial stream of the MIMO system; each beam-forming vector comprises a series of elements; each element specifies a beam-forming weight for a transmit antenna of the transmitter; and the method comprises: obtaining a beam-forming matrix in which the elements are quantized; and orthogonalizing the beam-forming vectors with respect to one another.

7 Claims, 3 Drawing Sheets

(56) References Cited

U.S. PATENT DOCUMENTS

| | | | |
|---|---|---|---|
| 2004/0014503 A1 | 1/2004 | Lobinger et al. | |
| 2008/0019457 A1* | 1/2008 | Waters et al. | 375/267 |
| 2009/0247200 A1* | 10/2009 | Hwang et al. | 455/507 |
| 2010/0232527 A1* | 9/2010 | Li et al. | 375/260 |
| 2011/0111747 A1* | 5/2011 | Tosato | 455/422.1 |
| 2011/0244847 A1* | 10/2011 | Mallik et al. | 455/422.1 |
| 2012/0281659 A1* | 11/2012 | Zhang et al. | 370/329 |
| 2013/0083864 A1* | 4/2013 | Moulsley | 375/267 |
| 2013/0201912 A1* | 8/2013 | Sheng et al. | 370/328 |

OTHER PUBLICATIONS

GB Search Report for GB Appln. No. GB1212151.3, dated Nov. 7, 2012.

Graham-Schmidt Process, Wikipedia, the free Encyclopedia, 6 pgs, May 14, 2012.

"IEEE Standard for Information Technology—Telecommunications and information exchange between systems—Local and metropolitan area networks—specific requirements", IEE Computer Society, IEEE Std 80211n, Oct. 29, 2009.

* cited by examiner

MULTIPLE-INPUT, MULTIPLE-OUTPUT TELECOMMUNICATIONS SCHEMES

CROSS REFERENCE TO RELATED APPLICATION

This application is a continuation-in-part application of pending U.S. patent application Ser. No. 13/178,342, filed Jul. 7, 2011.

FIELD OF THE INVENTION

The invention relates to the field of digital telecommunications. More particularly, the invention relates to multiple-input, multiple output (MIMO) telecommunications systems.

BACKGROUND OF THE INVENTION

A MIMO system is one in which a transmitter employs multiple antennae for transmitting data to a receiver. The data may consist of multiple data streams. The signal transmitted at each transmitter antenna is a linear combination of data streams. The receiver that is intended to receive the data streams and recover the data may have more than one reception antenna such that there is receive diversity as well as transmit diversity. Generally speaking, a system can still be described as a special case of MIMO [also known as MISO] when there is in practice one reception antenna working with signals from multiple transmitter antennae.

MIMO is used in the IEEE 802.11 standards to enhance the data rate provided by the physical layer in a transmission link between a transmitter and a receiver. Beam-forming feedback is a critical step to enable the transmitter to optimise MIMO transmission to maximise the data rate of the transmission link to the receiver. In explicit beam-forming feedback, the receiver informs the transmitter about the preferred beam-forming matrix. The beam-forming matrix is sometimes known as the spatial mapping matrix. The beam-forming matrix has a number of columns equal to the number Ns of spatial streams in the MIMO scheme and a number Nt of rows equal to the number of transmit antennae in the MIMO scheme. More precisely, there is a row for each transmitter antenna and a column for each spatial stream. The columns are often referred to as beam-forming vectors since each column provides the set of complex-valued, beam-forming weights that are to be applied to the transmitter antennae for the spatial stream to which the column in question corresponds.

In MIMO schemes, consideration must be given to how to quantise the beam-forming matrix and represent the beam-forming matrix with a limited number of bits.

A natural solution to quantise the beam-forming matrix is to use Nb bits to quantise the real part and another Nb bits to quantise the imaginary part of each of its elements. Thus, for a beam-forming matrix with dimension Nt×Ns, the beam-forming feedback requires 2×Nb×Nt×Ns bits per matrix. This type of direct quantisation will be referred to hereinafter as "Cartesian quantisation".

SUMMARY OF THE INVENTION

According to one embodiment of the invention there is provided, a method of feeding back, to a transmitter from a receiver in a MIMO communications system, at least part of a beam-forming vector of a beam-forming matrix The vector relates to a spatial stream of the MIMO system and the vector comprises a series of elements. Each element specifies a beam-forming weight for a respective transmit antenna of the transmitter. According to the method, a scaling factor is calculated that would scale a first element of the vector to a value of one. The other element or elements of the vector are scaled with the scaling factor. The scaled other element or elements are fed back to the transmitter to inform a beam-forming process.

In certain embodiments, element of the vector having the largest modulus is the element that is selected to be said first element.

In certain embodiments, the position that the first element occupies within the vector is fed back to the transmitter.

In certain embodiments, the position that the first element occupies within the vector is predetermined and known to the transmitter.

In certain embodiments, the scaled other element or elements are quantised prior to feeding them back to the transmitter.

According to another embodiment of the invention, there is provided a method of processing a beam-forming matrix. The beam-forming matrix is for adjusting signals that are to issue from the transmit antennae of a MIMO communications system. The MIMO communications system comprises a transmitter and a receiver. The beam-forming matrix is capable of being decomposed into a series of beam-forming vectors. Each beam-forming vector relates to a spatial stream of the MIMO system and each beam-forming vector comprises a series of elements. Each element specifies a beam-forming weight for a transmit antenna of the transmitter. According to the method, there is obtained a beam-forming matrix in which the elements are quantised. The beam-forming vectors in that matrix are then orthogonalised with respect to one another.

In certain embodiments, a Gram Schmidt process is used to orthogonalise the beam-forming vectors with respect to one another.

In certain embodiments, the transmitter of the MIMO system has multiple antennae but the receiver has a single antenna. In other embodiments, the both the transmitter and the receiver have multiple antennae, but not necessary the same number.

The invention can also be embodied as apparatus configured to perform one or more of the methods of the invention.

BRIEF DESCRIPTION OF THE FIGURES

By way of example only, certain embodiments of the invention will now be described by reference to the accompanying drawings, in which.

DETAILED DESCRIPTION

Figure 1:
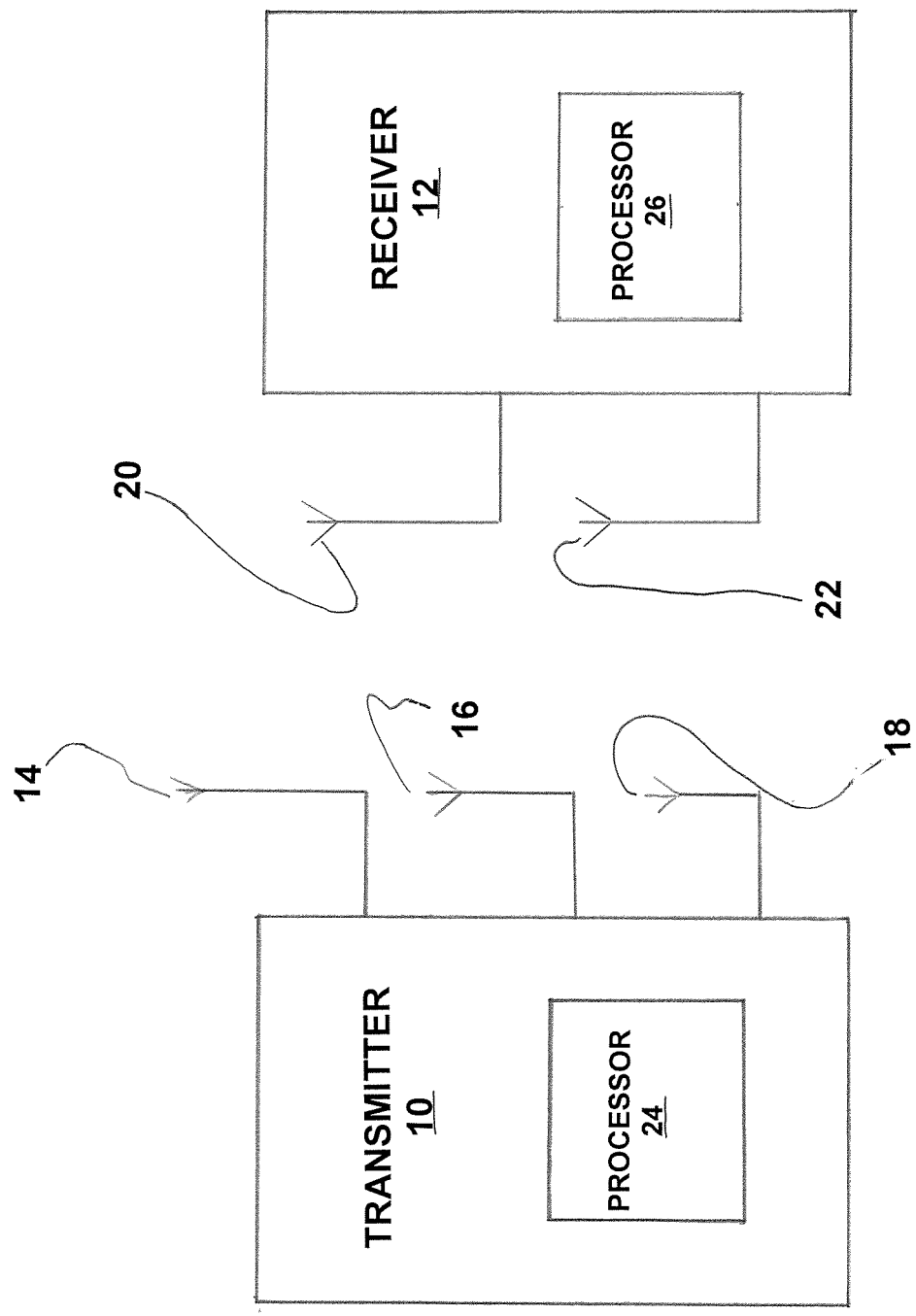
FIG. 1 is a block diagram schematically illustrating a MIMO communications system.

FIG. 1 shows a transmitter 10 and a receiver 12 sustaining a MIMO data link. The transmitter 10 has three transmit antennae 14, 16, 18 and the receiver 12 has two receive antennae 20 and 22.

Amongst other parts, the transmitter 10 includes a digital data processor 24. The processor 24 is tasked with, amongst other things, the following:

deriving from a data signal to be transmitted the spatial streams that are to be sent from each of the antennae 14, 16, 18.

decompressing beam-forming matrices fed back by the receiver 12.
orthogonalising beam-forming matrices fed back by the receiver 12.
applying the weights specified in the beam-forming matrices to the spatial streams that are to be transmitted in order to implement the beam-forming requested by the receiver 12.

Amongst other parts, the receiver 12 includes a digital data processor 26. The processor 26 is tasked with, amongst other things, the following:
recovering from the signals received at the receive antennae 20 and 22 an estimate of the data that was used to generate the spatial streams in the transmitter.
calculating the beam-forming weights that should be applied at the next update to the set of transmitter antennae 14, 16, 18 for each of the spatial streams that are being sent.

It will be readily apparent to the skilled person that the transmitter 10 and the receiver 12 include many more elements than those described above. Only those elements of the transmitter 10 and receiver 12 that are useful for describing embodiments of the invention appear in the discussions in this document.

The manner in which the processor 26 calculates the beam-forming weights will now be described.

In the MIMO approach currently employed with the existing 802.11 standards, a set of beam-forming weights is derived for each spatial stream that is to be transmitted by the transmitter 10. Each such set is conventionally known as a beam-forming vector. The elements in a beam-forming vector are the beam-forming weights that are to be applied to the transmit antennae for the transmission of the corresponding spatial stream. Each element in a beam-forming vector is a complex-valued beam-forming weight for a corresponding one of the transmit antennae. The beam forming vectors are column vectors by convention and in the case of the exemplary arrangement shown in FIG. 1, these vectors are three elements long (one element for each of antennae 14, 16 and 18). The beam-forming vectors for the set of spatial streams in use can be collected together to create a beam-forming matrix, in which the columns are the beam-forming vectors and each row relates to a respective one of the transmit antennae such that each row therefore contains the set of beam-forming weights that are used at a particular transmit antennae for the different spatial streams.

The processor 26 is arranged to recalculate the beam-forming matrix periodically and to feed the updated versions of that matrix back to the transmitter 10 so that the processor 24 can refresh the beam-forming weights that are used for the antennae 14, 16 and 18 for the different spatial streams that are presently in use.

We consider the applications where beam-forming performance is independent of the phase and magnitude of the beam-forming vectors relative to one another. To put it another way, it is only the relative—not the absolute—magnitudes and phases of the complex-valued elements within a beam-forming vector that are important. Therefore, it is possible and acceptable to add the same phase to the phases of all elements of a beam-forming vector. It is also possible and acceptable to multiply the magnitude of all elements of a beam-forming vector by the same factor. Using these transformations, it is possible to process a beam-forming vector to transform it such that one of its elements is the real number "+1".

The raw beam forming matrix can be denoted $V = [v_{i,j}] \in C^{N_p \times N_s}$. That is to say, a matrix of complex numbers, having Nt rows and Ns columns. Having derived a raw beam-forming matrix, the processor 26 can use the process outlined in FIG. 2 to transform the matrix such that each column contains an element that is the real number "+1".

Figure 2:
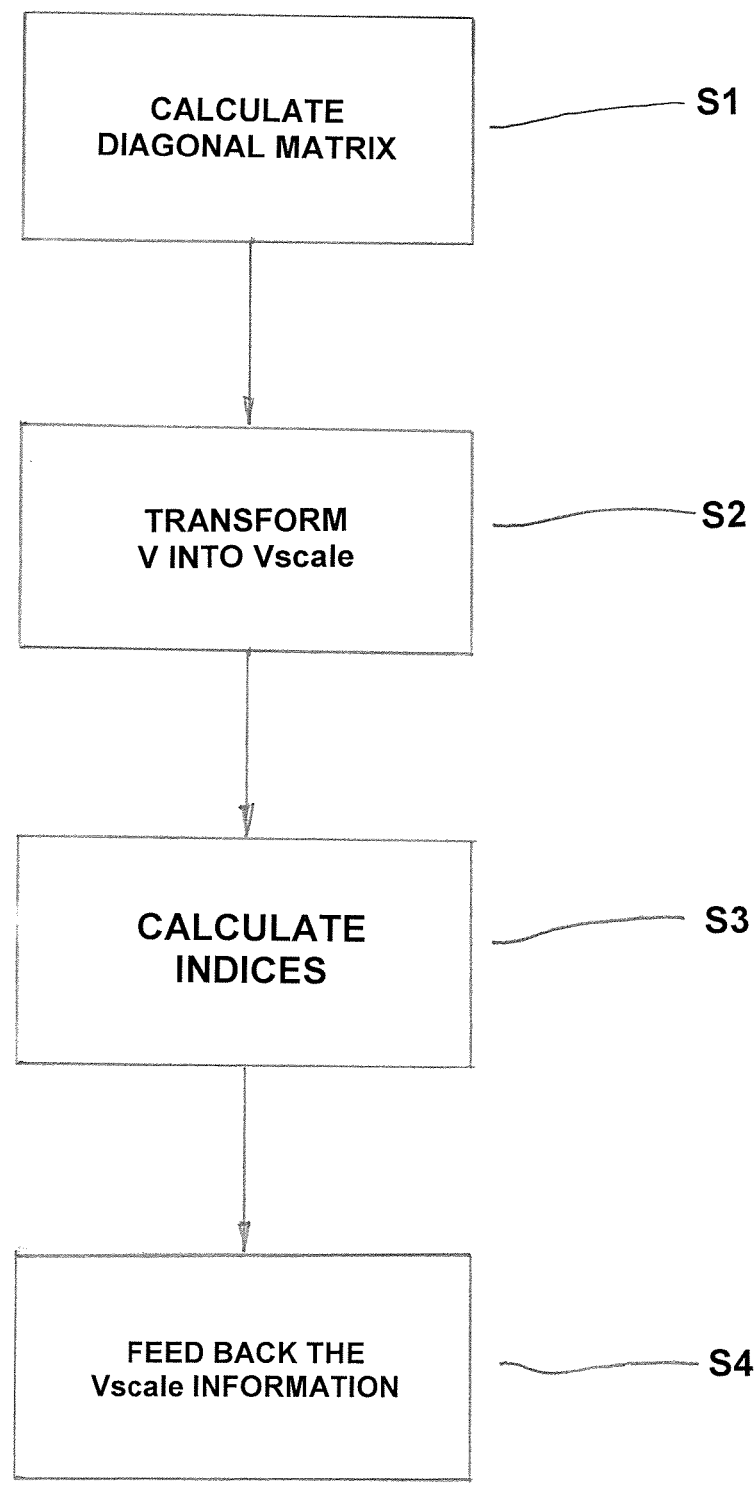
FIG. 2 is a flow chart illustrating a process for deriving beam-forming matrices.

In step S1 of FIG. 2, the processor 26 calculates a diagonal matrix D, where:

$$D = \text{diag}([d_j]), \; j = 1 \ldots N_s, \; d_j = \frac{v_{max,j}^*}{|v_{max,j}|}, \; v_{max,j} = \max_{i=1 \ldots N_t} |v_{i,j}|$$

j is the column index of the matrix D.
$v_{max,j}$ is the element in column j having the highest modulus out of the elements in that particular column.

In step S2, the processor 26 transforms V into $V_{scale}$ by performing the operation:

$$V_{scale} = V \cdot D$$

Diagonal matrices are well understood. See, for example, Chapter 17 of "Mathematical Methods for Science Students", Second Edition, Stephenson G, Longman Scientific & Technical.

After this transformation, one element in each column vector of the transformed beam-forming matrix $V_{scale}$ will have the value of "+1". In the $j^{th}$ column vector of $V_{scale}$, the "+1" appears at the position occupied by $v_{max,j}$ in the $j^{th}$ column of V. These "+1" values do not need to be fed back to the transmitter 10 in an explicit way. Instead, an index is sent back to the transmitter for each column vector of $V_{scale}$ to represent the position of this 1 inside that vector. As both the transmitter 10 and the receiver 12 know the number of transmit antennae 14, 16, 18, the minimum number Np of bits that needs to be used to represent this index is variable depending on the number Nt of transmit antennae, as tabulated in the following table.

| Nt | 2 | 3, 4 | 5, 6, 7, 8 |
|---|---|---|---|
| Np | 1 | 2 | 3 |

Taking again the exemplary scheme of FIG. 1, it will be apparent that for that scenario Np=2 since Nt=3. If, in the $j^{th}$ column vector of the version of V describing the FIG. 1 scenario, the entry with the highest modulus appears at, for example, row i=2, then the index for that column of $V_{scale}$ will be the binary number 10 (in the simple MSB to LSB convention, although other conventions could of course be used).

This indexing scheme is of course extensible to higher Np and Nt.

In step S3, the indices for the column vectors of $V_{scale}$ are calculated by the processor 26 using the methodology described above.

In step S4, the processor 26 arranges for the receiver 12 to feed back to the transmitter over the air for each column vector of $V_{scale}$ the index determined in step S3 and the elements of that vector other than the one specified by the index.

Thus, with the method explained by reference to FIG. 2, the number of bits needed to encode a beam-forming matrix is reduced from the 2×Nb×Nt×Ns of V to the (2×Nb×(Nt−1)×Ns)+(Np×Ns) of $V_{scale}$.

This transformation from V to $V_{scale}$ effectively uses different scaling for each column vector, since $v_{max,j}$ is calculated for each column j of V. In other words, in creating $V_{scale}$, the elements within any given column of V are scaled down by the modulus of the element in that column of V that has the highest modulus. By reducing the moduli of the matrix elements in this way, the quantisation accuracy for those elements is helpfully increased without altering the number of bits Nb that is used for the quantisation.

Optimally, a beam-forming matrix will have orthogonal column vectors. This is the case with beam-forming matrices obtained through Singular Value Decomposition [SVD]. However, the quantisation process performed in the receiver 12 (over Nb bits, it will be recalled) will destroy the orthogonality. The transmitter 10 can therefore re-orthogonalise the quantised beam-forming matrix. This can further improve the beam-forming feedback performance, which is useful when the number of column vectors in the beam-forming matrix is greater than one.

Figure 3:
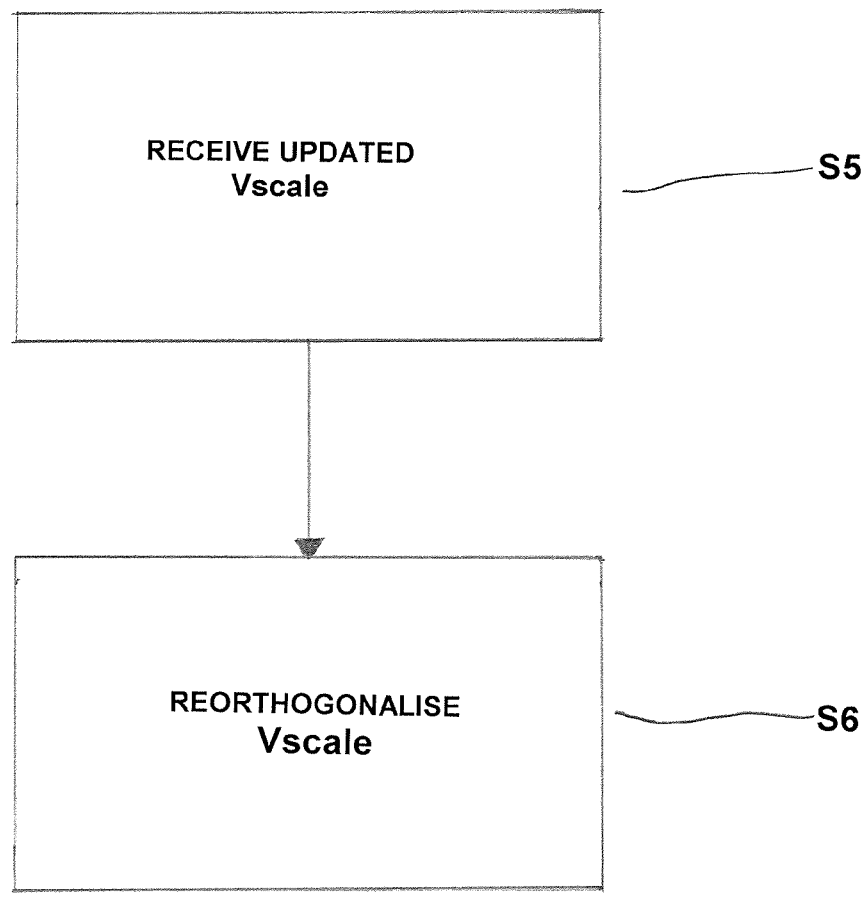
FIG. 3 is a flow chart illustrating a process for orthogonalising quantised beam-forming matrices.

FIG. 3 shows a process that processor 24 employs to re-orthogonalise the matrices $V_{scale}$ that it periodically receives.

In step S5 of FIG. 3, the processor 24 receives an updated version of $V_{scale}$ from the receiver 12.

In step S6, the processor 24 executes a Gram-Schmidt process to re-othogonalise the version of $V_{scale}$ received in step S5. This Gram-Schmidt algorithm is as follows.

It is assumed that the quantised beam-forming matrix is $V_q$ and that $V_q(:,k)$ denotes the $k^{th}$ column vector. We define $U(:,1)=V_q(:,1)$, and the iterative Gram-Schmidt process can be expressed as:

$$U(:,k) - \sum_{n=1}^{k-1} \frac{V_q^H(:,k) \cdot U(:,n)}{U^H(:,k) \cdot U(:,n)} \cdot U(:,n)$$

$$V_{gs}(:,k) = \frac{U(:,k)}{\sqrt{U^H(:,k) \cdot U(:,k)}}$$

The matrix $V_{gs}$ then becomes an orthogonal matrix.

More detail about the Gram-Schmidt process can be found in "Matrix Computations", Third Edition, 1996, Golub G H et al, Johns Hopkins University Press. Other solutions to achieving this re-orthogonalisation will be apparent to the skilled person, for example Householder transformations and Givens rotations.

In the embodiment of a MIMO scheme described above with reference to FIGS. 1 to 3, the element with the largest modulus in each column of V is identified and is forced to become the real number "+1". In a variation of that scheme, the index of the element that is to be forced to "+1" in each column of V is predetermined for each column. For example, the first element of each column could be forced to "+1", in which case instead of $$D = \text{diag}([d_j]), j = 1 \ldots N_s, d_g = \frac{v_{max,j}^*}{|v_{max,j}|}, v_{max,j} = \max_{i=1 \ldots N_t} |v_{i,j}|$$

we would have:

$$D = \text{diag}([d_j]), j = 1 \ldots N_s, d_j = \frac{v_{1,j}^*}{|v_{1,j}|}$$

In this alternative scenario, the indices would not need to be computed, nor sent back to the transmitter 10, since the transmitter would always know that it is the first element of each column vector of $V_{scale}$ that has been forced to "+1". Of course, in this embodiment, it could no longer be guaranteed that, within a given column vector of $V_{scale}$, the elements where i>1 have been scaled down by the largest modulus in that vector as it appears in V, with the result that the improvement in quantisation accuracy could not be guaranteed.

In yet another alternative scenario, each column vector would be scaled by the magnitude of its biggest element and rotated such that one of its elements (for example the first element of each vector) is real valued rather than complex.

The discussions above have followed the convention where the columns of the beam-forming matrix denote the spatial streams and the rows denote the transmit antennae. Of course, this could be reversed, with the rows representing the spatial streams and the columns representing the transmitters—in which case, the modifications required to render the foregoing techniques operational will be readily apparent to the skilled reader.

The invention claimed is:

1. A method of feeding back, to a transmitter from a receiver in a multiple-input, multiple output (MIMO) communications system, at least part of a beam-forming vector of a beam-forming matrix, wherein:
   the vector relates to a spatial stream of the MIMO system;
   the vector comprises a series of elements;
   each element specifies a beam-forming weight for a respective transmit antenna of the transmitter;
   and the method comprises:
   calculating a scaling factor that would scale a selected element of the vector to a value of one;
   scaling the other element or elements of the vector with the scaling factor;
   feeding back the scaled other element or elements to the transmitter to inform a beam-forming process; and
   feeding back to the transmitter the position that the selected element occupies within the vector.

2. A method of feeding back, to a transmitter from a receiver in a multiple-input, multiple output (MIMO) communications system, at least part of a beam-forming vector of a beam-forming matrix, wherein:
   the vector relates to a spatial stream of the MIMO system;
   the vector comprises a series of elements;
   each element specifies a beam-forming weight for a respective transmit antenna of the transmitter;
   and the method comprises:
   selecting as a selected element of the vector that element of the vector having the largest modulus
   calculating a scaling factor that would scale the selected element of the vector to a value of one;
   scaling the other element or elements of the vector with the scaling factor; and
   feeding back the scaled other element or elements to the transmitter to inform a beam-forming process.

3. The method of claim 2, further comprising feeding back to the transmitter the position that the selected element occupies within the vector.

4. The method of claim 1, further comprising quantising the scaled other element or elements prior to feeding them back to the transmitter.

5. A receiver for a MIMO communications system, the receiver configured to feed back, to a transmitter of the MIMO communications system, at least part of a beam-forming vector of a beam-forming matrix, wherein:
   the vector relates to a spatial stream of the MIMO system;
   the vector comprises a series of elements;
   each element specifies a beam-forming weight for a respective transmit antenna of the transmitter;

and the receiver comprises a processor configured to:
calculate a scaling factor that would scale a selected element of the vector to a value of one;
scale the other element or elements of the vector with the scaling factor;
feed back the scaled other element or elements to the transmitter to inform a beam-forming process; and
feed back to the transmitter the position that the selected element occupies within the vector.

6. The apparatus of claim 5, wherein the processor is further configured to select to be said selected element that element of the vector having the largest modulus.

7. The apparatus of claim 5, wherein the processor is further configured to quantise the scaled other element or elements prior to feeding them back to the transmitter.

* * * * *

UNITED STATES PATENT AND TRADEMARK OFFICE
CERTIFICATE OF CORRECTION

PATENT NO. : 8,654,877 B2
APPLICATION NO. : 13/179178
DATED : February 18, 2014
INVENTOR(S) : Tong et al.

Page 1 of 1

It is certified that error appears in the above-identified patent and that said Letters Patent is hereby corrected as shown below:

In the Specification

In Column 4, Line 10, delete " $\max\limits_{i=1 \ldots N_i} |v_{i,j}|$ " and insert -- $\max\limits_{i=1 \ldots N_t} |v_{i,j}|$ --, therefor.

In Column 5, Lines 29-30, delete " $U(:,k) - \sum\limits_{n=1}^{k-1} \frac{V_q^H(:,k) \cdot U(:;n)}{U^H(:,k) \cdot U(:,n)} \cdot U(:,n)$ " and insert -- $U(:,k) = V_q(:,k) - \sum\limits_{n=1}^{k-1} \frac{V_q^H(:,k) \cdot U(:,n)}{U^H(:,k) \cdot U(:,n)} \cdot U(:,n)$ --, therefor.

In Column 5, Line 54, delete " $d_g = \frac{v^*_{max,j}}{|v_{max,j}|}$ , " and insert -- $d_j = \frac{v^*_{max,j}}{|v_{max,j}|}$ , --, therefor.

Signed and Sealed this
Sixth Day of May, 2014

Michelle K. Lee
*Deputy Director of the United States Patent and Trademark Office*